No. 755,937. PATENTED MAR. 29, 1904.
E. H. RICHARDSON & F. J. KIMBALL.
FRUIT CLEANER AND GRADER.
APPLICATION FILED JAN. 25, 1902.
NO MODEL. 4 SHEETS—SHEET 3.
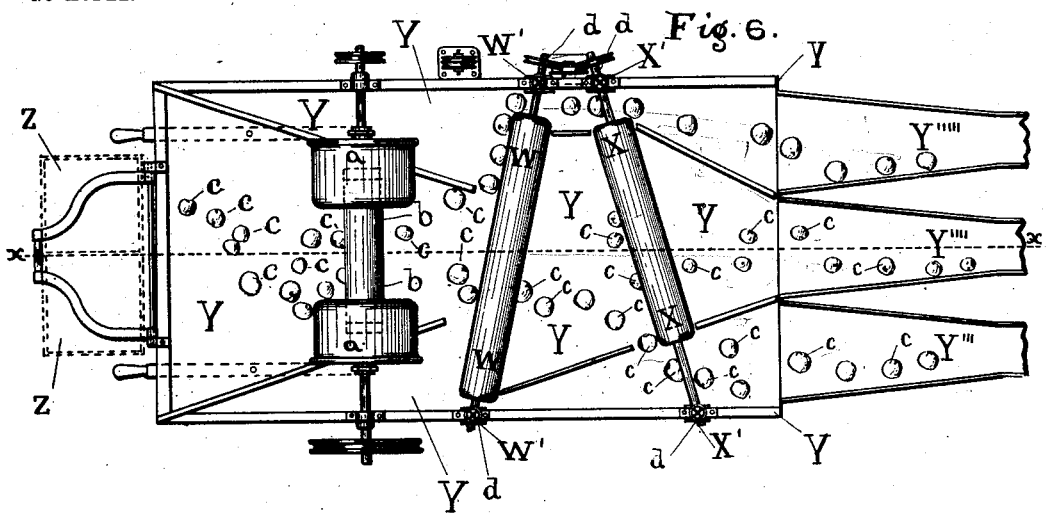
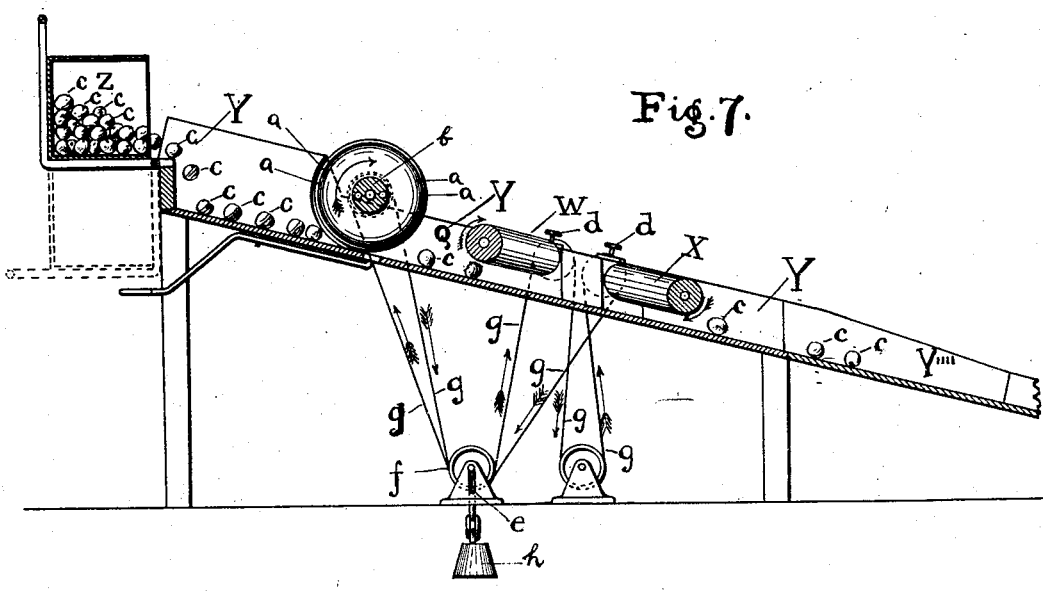

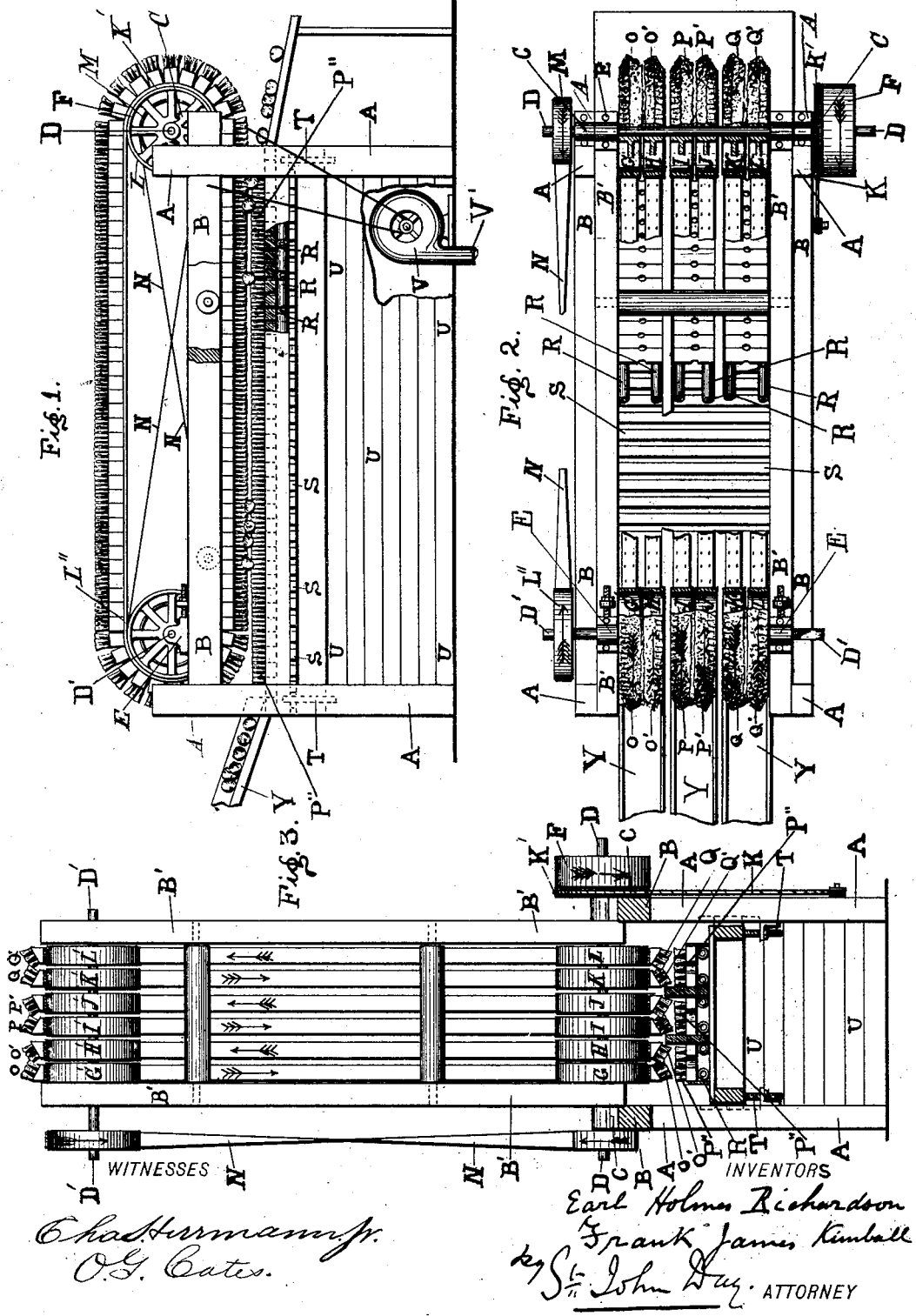

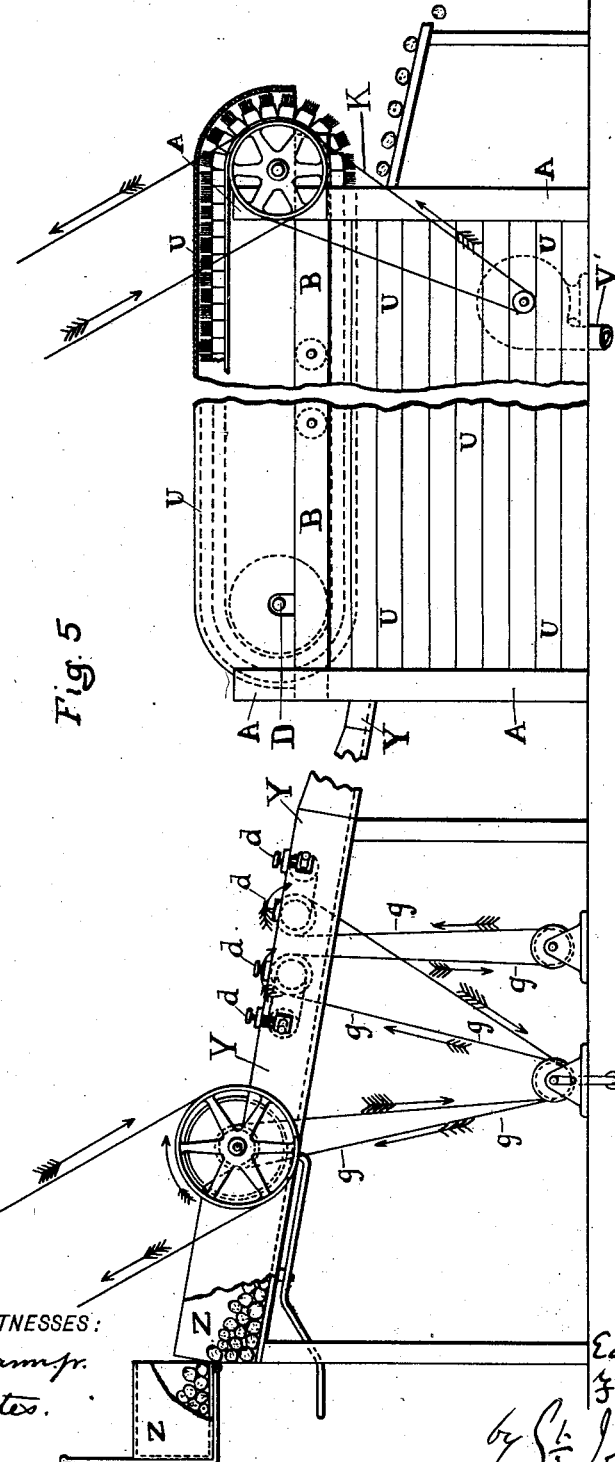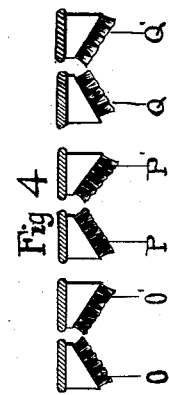

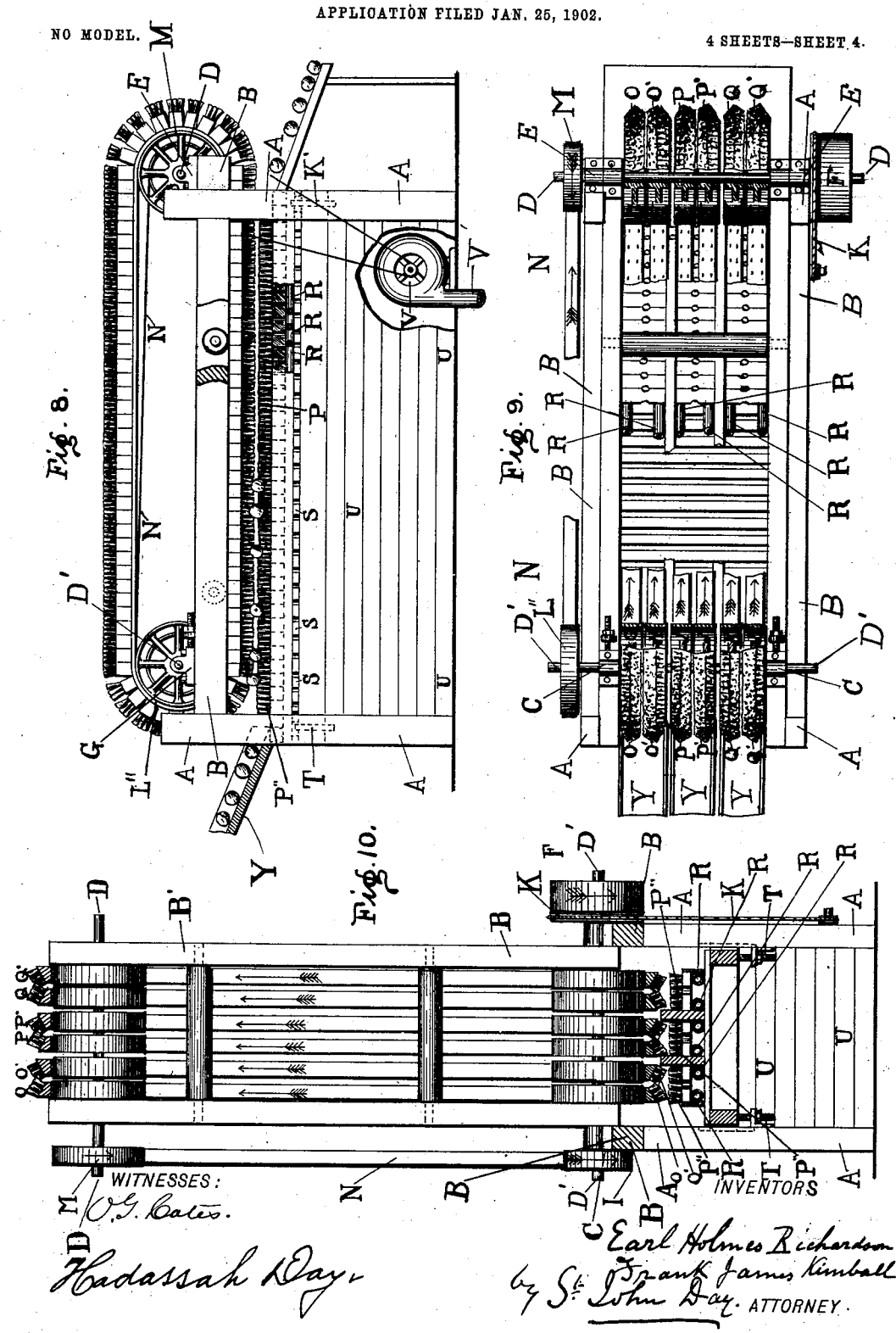

No. 755,937. Patented March 29, 1904.

UNITED STATES PATENT OFFICE.

EARL HOLMES RICHARDSON, OF NORTH ONTARIO, AND FRANK JAMES KIMBALL, OF LOS ANGELES, CALIFORNIA.

FRUIT CLEANER AND GRADER.

SPECIFICATION forming part of Letters Patent No. 755,937, dated March 29, 1904.

Application filed January 25, 1902. Serial No. 91,184. (No model.)

*To all whom it may concern:*

Be it known that we, EARL HOLMES RICHARDSON, of North Ontario, in the county of San Bernardino, and FRANK JAMES KIMBALL, of the city of Los Angeles, in the county of Los Angeles, in the State of California, have invented a certain new and useful Fruit Cleaner and Grader, of which the following is a full, clear, and exact description or specification, reference being had to the annexed sheets of drawings and to the letters marked thereon.

Our said invention, which relates to a machine for brushing or cleaning and grading or sizing fruit in respect of that part thereof which brushes or cleans the fruit, is capable of being operated in two distinct modes of movement of pairs of traveling belts carrying brushes which are inclined toward each other transversely, as hereinafter described.

In respect of the brushing and cleaning of fruit our machine is especially applicable for removing from the fruit treated therein scale, smut, or parasite which has accumulated upon the fruit during the time of its growth and before being removed from the trees upon which it has grown. The belts of brushes constituting each pair of cleaning-belts may either be operated in opposite directions of travel of each brush of each pair of brushes at the same speed or at different speeds, or each pair of belts of brushes may be operated in the same direction either at the same speed or at different speeds. When the brushes operate in opposite directions, then the pulleys which drive the brush-belts are driven by a crossed belt for the purpose of imparting reversed direction of rotation to the driving shafts and pulleys which operate the brush-belts. When the brush-belts operate in the same direction, the shafts and pulleys which cause their movement are driven in one and the same direction of rotation by an open belt as distinct from a crossed belt, the variations in speed of the movements of the brushes when moved in either direction being effected by using driving and driven pulleys of different diameters, as is well understood, according to the variation in rates of travel of the brushes.

The cleaning and brushing machine consists of a rectangular framing, in the upper part of which there are carried the rotating shafts and pulleys for operating the pairs of traveling belts, each belt of each of which pairs of belts travels in opposite directions when the machine is operated in one mode and each of which belts of each pair of belts travels in the same direction when operated in the other mode; but the machine itself is identical under both modes of its operation.

The pairs of brushes are driven by pulleys carried upon driving-shafts, which rotate in bearings. The bearings of one of these shafts are attached to the stationary framing of the upper part of the machine, and the bearings of the other shaft are attached to carrying-arms, which when lifted or moved upward through a circular path whose center is the axle or shaft carried in bearings fixed to the framing of the machine may, together with the pulleys at the outer end of the carrying-arms and the aforesaid brushes, be raised upward at an angle and be separated to any required extent from the under brush or brushes of the machine, as hereinafter more fully set forth. By means of this arrangement the traveling brushes are not only capable of being supported angularly above the fixed brush or brushes, (which consist either of one or more flat brushes carried in the manner hereinafter described,) but facility is thereby afforded for removing any fruit which may accidentally become pressed, held, or retained by any of the brushes, and facility is also afforded by this arrangement for at all times inspecting the several brushes for ascertaining their condition or state of wear and to repair, remove, or replace such brushes whensoever required. Each pair of traveling belts or bands, with the transversely-inclined traveling brushes on the outer surface thereof, has the brushes of each pair of belts or bands of brushes so attached that a triangular space transversely is formed or inclosed by or between each pair of belts or bands of traveling brushes and the flat brush or brushes constituting the under or fixed brush or brushes for supporting the fruit, and through this triangular space the fruit to be brushed or cleaned passes by the traveling action of the moving brushes from the feeding to the discharging end of the machine.

It is to be understood that the under flat brush or brushes, which is or are preferably stationary, is or are carried elastically upon pneumatic bearings consisting of elastic tubes filled with air compressed to any desired extent and supported upon a framing with vertical adjustment for the purpose of regulating distances between the stationary under brush or brushes and the traveling upper brush or brushes.

The upper part of the machine is provided with a box or casing to prevent the scale, dust, and dirt, or parasite while being removed from the fruit from being scattered around the machine, and to prevent the scale, dust, dirt, or parasite brushed or cleaned from the fruit from being thus scattered the entire machine, so far as is practicable, is boxed in or incased and provided with an exhaust-fan or the mechanical equivalent thereof for freeing or exhausting the scale, dirt, or parasite and delivering it into a duct leading to any place or receptacle for collecting and preventing the spread of the same.

For the purpose of facilitating the removal of scale, dirt, dust, or parasite which at times adheres very closely and tightly to the surface of the fruit being brushed or cleaned one or more sprays of water may be introduced into or upon and between the brushes, thus rendering the removal of the scale, dust, dirt, or parasite in some cases more easily effected than when using the machine with the fruit in the dry condition.

The machine constituting our invention is provided with mechanism for grading the fruit as it is delivered into the brushing and cleaning part thereof, all as hereinafter described with reference to the annexed drawings.

Both the moving and the stationary brushes may be placed horizontally or vertically, or they may be placed to operate on an inclined plane.

Upon the annexed drawings, Figure 1 is a side elevation, partly in section, showing the brushing and cleaning part of our improved mechanism and the means for exhausting out of the machine the scale, dust, dirt, or parasite removed therefrom, but without the covering or casing of the upper part thereof, and arranged with the brushes of each pair traveling in opposite directions. Fig. 2 is a part plan and part horizontal section corresponding to Fig. 1. Fig. 3 is an end elevation of our improved machine looked at when the upper brushes and the framing which carries one of the shafts, together with the brushes, is raised upward out of the operative position and corresponding to Figs. 1 and 2. Fig. 4 is a transverse section, on a larger scale, of three pairs of the traveling belts and the transversely-inclined brushes carried upon the said belts. Fig. 5 is a side elevation, partly in section, of the whole of our improved fruit brushing and cleaning, feeding, and grading mechanism, partly broken through in length. Fig. 6 is a plan of the feed mechanism and the grader shown upon an enlarged scale Fig. 7 is a side elevation of the feeding and grading mechanism on the same scale as Fig. 6. Fig. 8 is a side elevation, partly in section, showing the brushing and cleaning part of our machine, wherein each pair of brushes is arranged to operate in the same direction, but at different speeds. Fig. 9 is a plan, partly in horizontal section, corresponding to Fig. 8. Fig. 10 is an end elevation of our improved machine corresponding to Figs. 8 and 9 looked at endwise with the upper brushes and the frame which carries one of the shafts together with the brushes raised upward out of the operative position.

With reference to Figs. 1, 2, 3, 4, and 5 of the annexed drawings, in which the brushes of each pair travel in opposite directions, the framing of the machine is marked A, and it consists of the upright end bars A, carrying the longitudinal bars B at the upper part thereof, as shown. Upon one end of these bars B there are carried the fixed bearings C for the driving-shaft D, and at the opposite end of the bars B' there are carried the adjustable bearings E of the other or driven shaft D', as shown at Fig. 1. Upon the driving-shaft D there is carried the main driving-pulley F, which is operated by means of a belt from any driving-shaft or prime mover. The several arrows upon the several parts of the mechanism indicate the direction of movement of the several parts of the mechanism throughout the figures of drawings. Upon the driving-shaft D there are mounted six pulleys G, H, I, J, K, and L, respectively. Of these pulleys those marked G and I are keyed to the driving-shaft D, while those marked H and J revolve loosely upon the driving-shaft D, and those marked K and L are one keyed and the other is loosely rotative upon the driving-shaft D. Upon the opposite shaft D' there are mounted six similar pulleys, respectively marked G', H', I', J', K', and L', and of these pulleys those marked H' and J' are keyed to the shaft D, while the pulleys marked G' and I' and those marked K' and L' are one keyed and the other loose upon the shaft D'. Upon one end of each of the shafts D and D' there are keyed two belt-pulleys L" and M, respectively, over and upon which the crossed driving-belt N passes or travels and transmits motive power, as is well understood, and, being a crossed belt, while the pulley M is driven in one direction the pulley L" is driven in the opposite direction. By means of this arrangement it is obvious that each pair of brushes, consisting of the belts and inclined brushes O and O', P and P', Q and Q', respectively, is or are driven in opposite directions—that is to say, while the brush O, the brush P, and the brush Q of each pair move in one direction the brushes O', P', and Q' of each pair move in opposite directions, and by varying the diameters of the pulleys M and L'', respectively, the brushes O O', P P', and Q Q' of each pair of brushes may be caused while moving in opposite directions to also move with different rates of travel, so that the fruit which enters between the brushes from the delivery-ducts Y Y is most effectively brushed or cleaned by not only being brushed simultaneously in opposite directions, but also by the variation in movement both in direction and velocity or rate by each pair of brushes O O', P P', Q and Q causing the fruit to be exposed at every part of its surface to the brushing or cleaning action of the machine. The under brushes P'' of the machine are carried upon elastic tubes R and slats S after the manner set forth in the application for Letters Patent of Swan and Richardson previously applied for, Serial No. 46,733, and need not, therefore, be herein further described. The vertical adjustment of the under brush is also similar to that set forth in the aforesaid application of the said Swan and Richardson by means of the vertical screws T. (Shown more especially in Fig. 3.)

In order to prevent as much as possible scale, dust, dirt, or parasite removed from the fruit being scattered about a packing-house or other place of inclosure where our said cleaning-machine is used, the machine is incased by a wooden or other casing, (marked U in the drawings,) and this casing is also applied to the upper part of the machine so as to inclose completely the traveling brushes, as shown more especially at Fig. 5, and when it is desired to move or lift up all the pairs of brushes to the position shown at Fig. 3—that is to say, upon the axis or shaft D—then the upper covering-head U (shown in Fig. 5) is first of all removed by simply lifting it off the upper part of the machine, and when in operation, the several parts of the mechanism being inclosed as hereinbefore stated, the exhaust-fan V, which may be an exhaust-fan of any suitable construction, pulls or exhausts the scale, dust, dirt, or parasite from the machine and casing and discharges it through the discharge V' of the fan-casing V, (shown more particularly at Fig. 1, wherein a portion of the boxing or incasement U of the machinery is broken away in order to show the said fan,) which is driven by means of a cord or belt from the grooved driving-pulley K'. (More especially shown at Figs. 2 and 3.)

In order to grade the fruit which is to be brushed and cleaned in the machine hereinbefore described, the feeding end of the machine in addition to the feeding mechanism itself is provided with grading-rollers and delivery-ducts, as shown more particularly in the enlarged views, Figs. 6 and 7, wherein there are three delivery-ducts corresponding to the three sets of traveling brushes shown at Figs. 1, 2, and 3 of the drawings. The feeding-rollers W and X, respectively, are arranged so as to rotate in the feed-hopper Y Y. The roller W is carried in bearings W' W', supported upon the edges of the hopper Y, and the roller X is similarly carried in bearings X' X'. At the upper part of the hopper there is shown the box of fruit, (marked Z,) from out of which the fruit to be cleaned and brushed is allowed to gradually fall and pass under the feed-roller $b\ b$, as shown more particularly at Fig. 6. The feed-roller is constructed of less diameter at its central part $b\ b$ than at its ends $a\ a$ and rotates in the opposite direction to that in which the fruit $c\ c$ moves from out of the box Z, so that the fruit $c\ c$ in passing beneath that part of the feed-roller $b\ b$ by the action of gravity collects against the grading-roller W W. The grading-roller W W is raised or lowered by the hand-screws $d\ d$ a sufficient distance above the bottom of the hopper Y to allow all but the largest fruit to pass beneath the roller W W, and this largest fruit then passes down the hopper Y into the feed-duct Y'''''. The fruit $c$ which passes beneath the roller W W moves toward the roller X, and that part of the fruit $c$ which is too large to pass beneath the roller X moves down the hopper Y into the feed-duct Y''', while the smallest fruit, which passes beneath the roller X, runs down the hopper Y into the middle feed-duct Y''''. From the feed-ducts Y''''' Y'''' Y''' the graded fruit passes and enters into the space between the stationary and moving belts of brushes at the feeding end of the machine.

With reference to our new or improved machine for brushing and cleaning fruit operated in the other mode to that hereinbefore described and shown on the preceding figures of the drawings, it is here explained that with reference to Figs. 8, 9, and 10 of the annexed drawings the traveling belts of brushes O and O', P and P', Q and Q' of each pair of brushes shown at Figs. 8, 9, and 10 travel in the same direction but at different speeds. This other mode of operating our said invention consists in actuating the driving-shafts D and D' with belt-pulleys L'' and M of different diameters upon which the open belt N N, Figs. 8, 9, and 10, is carried or driven. The brush-belt pulleys O O', P P', and Q Q' on each of the shafts D and D' are shown all of the same diameter and are each alternately fast and loose pulleys upon the driving-shafts D and D', so that as either of the driving-shafts D or D' is driven at a greater or less velocity and as the pulleys upon which the belts of brushes are carried in Figs. 8, 9, and 10 are of the same diameter it follows that each of the driving-pulleys L'' and M rotate at velocities corresponding with the rate of rotation of the driving-shafts D and D', so the driven pulleys on the shafts D and D' are rotated at different velocities. By this arrangement it is obvious that while each belt of brushes of each pair of belt-brushes is driven in the same direction, yet each belt of each pair of belt-brushes is at the same time driven at a different velocity.

It is to be understood that although we have in Figs. 1, 2, 3, 8, 9, and 10 of the annexed drawings shown three pairs of belt-brushes O O', P P', and Q Q' and three stationary brushes P" for operating in a brushing and cleaning machine simultaneously that our invention is not restricted to the use of three pairs of brushes, but that when used in connection with a grader, such as is hereinbefore described and shown at Figs. 6 and 7, for separating the fruit into three grades or sizes that then the brushing and cleaning part of our machine must be provided with three sets of brushes and their connected mechanism operating in the two modes hereinbefore described.

It is to be understood that when the fruit is of such an average or general size throughout a considerable quantity thereof, in such case the brushing and cleaning part of our mechanism may consist of one set of traveling and stationary brushes and their relative and connected operating parts operating in either mode hereinbefore described. It is also to be understood that the feeding and grading rollers hereinbefore described and shown more especially at Figs. 6 and 7 may be driven in any suitable or convenient manner; but that the arrangement of grooved pulleys and ropes on the ends of the feeding-roller and on the ends of the grading-rollers moving in the direction of the arrows, more especially shown at Fig. 7, constitutes an exceedingly convenient and practicable method of driving our feed and grading rollers; also, that a belt or rope tightening device consisting of the slotted bearing $e$, pulley $f$, and suspension-weight $h$ is used for the purpose of taking up any slack of the belt $g$ whenever such slackening takes place.

In addition to the several features of the invention hereinbefore described and shown upon the annexed sheets of drawings it is to be understood that an essential feature of our present invention consists in the movable brushes being placed at angles in opposite directions, while the lower brush is a flat brush.

Having now described the nature of our said invention and the best system, mode, or manner we are at present acquainted with for carrying the same into practical effect, we desire to observe in conclusion that what we consider to be novel and original and therefore claim as the invention to be secured to us by Letters Patent is as follows:

1. The fruit brushing and cleaning machine, consisting of the combination of a pair of driving-shafts, one of which is carried in stationary bearings fixed to the upper part of the framing of the machine, the belts or bands of angularly-situated brushes, inclined in opposite directions and downward over a flat non-traveling brush, the driving shaft and pulleys whereof one pulley of each pair of pulleys is keyed to its driving-shaft, and the corresponding pulley of the other pair of pulleys is carried loosely upon the other driving-shaft, and arranged so that the traveling brushes and one of the driving-shafts may be moved upward angularly so as to separate the traveling brushes from the flat stationary brushes; the flat stationary brushes; the adjustable bearings for tightening the belts of brushes, the mechanism for grading the fruit consisting of adjustable grading-rollers inclined transversely with the hopper, and in opposite directions of inclination, spaces at the ends and beneath each grading-roller, and provided with inclined partitions in the feed-hopper for directing the graded fruit into the feed-ducts of the brushing mechanism, the feed-ducts, all substantially as hereinbefore described.

2. In a fruit brushing and cleaning machine the traveling brushes and pulleys arranged in pairs, with traveling brushes inclined to each other and downward over a flat non-traveling brush, substantially as hereinbefore described.

3. In a feed-hopper of a fruit brushing and cleaning machine the adjustable inclined grading-rollers with a space beneath them through which the smaller fruit passes while the larger fruit travels along the grading-rollers, and having in connection with each roller an inclined partition, said inclined partition leading or directing the graded fruit into the divisions or ducts of the feed-hopper connected with the brushing-machine, substantially as hereinbefore described.

In testimony whereof we have hereunto set our hands and seals, in the presence of subscribing witnesses, this 24th day of October, A. D. 1901.

EARL HOLMES RICHARDSON. [L. S.]
FRANK JAMES KIMBALL. [L. S.]

Witnesses to Earl Holmes Richardson:
M. F. PALMER,
ST. JOHN DAY.

Witnesses to Frank James Kimball:
B. M. WILKINS,
W. E. MURRAY.